United States Patent
Yamagata et al.

(10) Patent No.: US 9,704,302 B2
(45) Date of Patent: Jul. 11, 2017

(54) OPERATION MANAGEMENT DEVICE OF SELF-PROPELLING MINING EQUIPMENT

(71) Applicant: Hitachi Construction Machinery Co., Ltd., Tokyo (JP)

(72) Inventors: Shohei Yamagata, Setagaya (JP); Rikiya Tajiri, Matsudo (JP); Yuki Hara, Ota (JP); Yoshimi Kasai, Nagareyama (JP); Tsugumichi Owaki, Koto (JP); Hiroshi Yoshikawa, Ota (JP); Takayuki Uchida, Hitachi (JP); Akira Ueno, Ichikawa (JP); Nobuyoshi Hirowatari, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 81 days.

(21) Appl. No.: 14/428,180

(22) PCT Filed: Sep. 21, 2012

(86) PCT No.: PCT/JP2012/074209
§ 371 (c)(1),
(2) Date: Mar. 13, 2015

(87) PCT Pub. No.: WO2014/045397
PCT Pub. Date: Mar. 27, 2014

(65) Prior Publication Data
US 2015/0269789 A1    Sep. 24, 2015

(51) Int. Cl.
*G07C 5/00* (2006.01)
*E21C 35/24* (2006.01)
(Continued)

(52) U.S. Cl.
CPC .............. *G07C 5/008* (2013.01); *E21C 35/24* (2013.01); *E21C 47/00* (2013.01); *E21F 17/18* (2013.01); *G05D 1/0287* (2013.01)

(58) Field of Classification Search
None
See application file for complete search history.

(56) References Cited

U.S. PATENT DOCUMENTS

| | | | |
|---|---|---|---|
| 2004/0040792 A1* | 3/2004 | Uranaka | E21F 13/00 187/382 |
| 2009/0012668 A1* | 1/2009 | Maesono | G07C 5/008 701/31.4 |

FOREIGN PATENT DOCUMENTS

| | | |
|---|---|---|
| JP | 10-143697 A | 5/1998 |
| JP | 2000-297443 A | 10/2000 |

(Continued)

*Primary Examiner* — Thomas G Black
*Assistant Examiner* — Ana Thomas
(74) *Attorney, Agent, or Firm* — Mattingly & Malur, PC (57) ABSTRACT

Operation of self-propelled mining equipment in the field can be accurately recognized at a remote position of the equipment. A management center for controlling a dump truck receives signal from sensors in order to show detection data for the working status of the operation instruments and warning indication data based upon the detection data. The warning indication data and the detection data for the working status of the operation instruments are displayed on the same display. Alternatively, in place of the detection data for working status of the operation instruments, related information from a data base concerning the record of maintenance previously conducted may be displayed, or a graph of the detection data for the working status of an operation instrument of another dump truck which is operating in the same working field may be displayed.

3 Claims, 8 Drawing Sheets

(51) Int. Cl.
*G05D 1/02* (2006.01)
*E21C 47/00* (2006.01)
*E21F 17/18* (2006.01)

(56) References Cited

FOREIGN PATENT DOCUMENTS

| | | |
|---|---|---|
| JP | 2001-266200 A | 9/2001 |
| JP | 2012-14951 A | 1/2012 |
| WO | 2010/073771 A1 | 7/2010 |

\* cited by examiner

OPERATION MANAGEMENT DEVICE OF SELF-PROPELLING MINING EQUIPMENT

FIELD OF THE INVENTION

The present invention relates to operation management device of self-propelling mining equipment, such as hydraulic or electric driving type excavating machine.

DESCRIPTION OF THE BACKGROUND ART

Main works at a field of mining is mining work and dressing work of ore. Mining work is to dig ore contained useful mineral out from a mining field, and dressing work of ore is to dress and extract useful mining material from dug ore.

Mining work is performed to dig the ground at a place to be presented vein in a mining field, while dressing ore is not performed at the working site of the mining area, but is performed at an independent yard which is installed various equipment necessary to dress and separate ore. Earth and sand are covered over the layer of ore, and the earth and sand are not included ore or useful material so that dumping site is provided for waste earth and sand.

As a mining equipment, an excavating machine such as a loader- or backhoe- type excavator or the like is used for mining purpose having electric- or hydraulic power source, and an extra-large sized excavating machine is normally used for the sake of working efficiency. While, a dump truck is used as a transportation machine to transfer mining ore from the mining field to the ore dressing yard and also to transfer waste earth and sand, rocks and the like to the dumping site. Usually, one excavating machine is combined with a plural number of dump trucks as a unit. Three to five dump trucks are provided in combination with one excavating machine, although may be varied the number of transportation machines to be combined depending upon the distance from mining field to the ore dressing yard, the excavating machine and the dump truck are typical mining equipment or mining machine.

Work in the mining field continues usually every 24 hours for 365 days without taking a day off, thus the mining machine or equipment such as the excavating machine and a dump truck should be operated in high efficiency as much as possible without causing break down. Therefore, sensors are provided for every mining machines at various positions for detecting conditions of being in operation of respective working parts. Upon detecting overload and conforming severe working condition, warning is transmitted to an operator in a case of resulting possible failure the working parts.

As explained foregoing, due to the mining machine works continuously without cessation and so forth, maintenance service and inspection cannot be performed frequently and works for maintenance and inspection should be conducted efficiently within short time period. For the sake of such purpose, as proposed for example in a patent document 1, a management center is equipped at a proper position within a field of mining for performing overall management for the mining machines with being received various data from respective sensors of the mining machine.

PRIOR ART DOCUMENT

Patent Document

Patent Publication JP 2012-149510 A1

SUMMARY OF THE INVENTION

Problem to be Solved by the Invention

In accordance with the patent document 1, detection data retrieved from sensors provided at various working parts of the mining machine are transmitted to the management center, then the management center judges as to whether or not some malfunction is recognized and which portion is occurred such the malfunction.

In this connection, at a time of detecting abnormal state from either of sensor data, it is necessary to carry out, as a matter of course, the works for maintenance and inspection, if the abnormal state is caused by malfunction of a device or apparatus. However, the abnormal state of the sensor is not always caused by the malfunction of the device or apparatus. For example, the mining machine is driven and operated by an operator, therefore ability and quality of the operator affects largely for the operation performance the mining machine. In addition, the abnormality of sensor data may be caused by irrational operation of the operator. Further, abnormal sensing may also be occurred depending upon weather condition or circumstance situation. Furthermore, the abnormality may be occurred in the sensor per se but not abnormality being occurred on the device or apparatus to be sensed.

In summary, it is not always to result abnormality for the device or apparatus consisting of the mining machine, even if any sensor provided on the mining machine detects abnormality, thus in some case that works for maintenance and inspection is not required to the mining machine due to being caused by the operator's quality and the like. Even if in a case of maintenance and inspection is required, further judgment is to be needed as to whether the maintenance working should be performed immediately or flexibility of time has some time allowance to start the maintenance works. In addition, it is necessary to determine menu for maintenance works such as how to and which manner should be performed for maintenance work, and the like.

However, since such judgment is done in the center which is remote from the mining machine, precise judgment cannot be performed merely from the detected data of sensors provided at various portions of the mining machine. That is to say, proper judgment cannot be finally made merely by means of information from the mining machine in the course of working as to whether or not to carry out the maintenance work, when the maintenance work is carried out, and what work should be carried out for the maintenance work.

The present invention is accomplished in light of the foregoing, the object of the present invention is to acquire precise information as to the status of self-propelling mining equipment under the operation on a working field at a remote place.

Means for Solving the Problem

In order to solve the foregoing problem, operation management device of self-propelling mining equipment in accordance with the present invention comprises an self-propelling mining equipment which is working in a mining field, and a management center for performing to control the operation of the self-propelling mining equipment, the self-propelling mining equipment being provided plural number of sensors for detecting the operation of component parts, the detection data being transmitted by means of a communication member to the management center, characterized in that the device further comprising: the management center having a signal processing member to perform signal processing for preparing detection data for working status of respective operation instruments based upon data transmitted from the self-propelling mining equipment to be displayed in the form of chronological pattern, and an image display member adapted to indicate graph of detection data for working status of the operation instruments; one or more warning levels being set to output signals from the sensors, and a warning indication region for showing warning indication data at respective warning levels, and the image display member together with the detection data for working status of the operation instruments or in place of the detection data for working status of the operation instruments; and the management center being connected an information storage member for storing related information as to operation instrument provided with the sensor, and the related information being read out from the information storage member to display the related data together with the warning indication data on the image display member.

In this connection, the working field to be operated the mining machine is a field of mining. Self-propelling mining equipment disposed in a mining field consist normally of an excavating machine having a digging mechanism and a dump truck as a means for transportation. The excavating machine is normally placed almost stationary during to perform excavation. While, the dump truck travels reciprocally between mining field and an ore dressing yard for dressing ore from others placed at a position remote from the mining field.

The self-propelling mining equipment is provided with various sensors, in a case of the dump truck, there are provided a speed meter to measure the vehicle travelling speed or the like, a rotation speed meter to detect rotational speed of the engine, a thermo-sensor to detect the temperature of respective parts, a load sensor to measure the weight of loaded substance, a pressure sensor, a velocity sensor, a voltage sensor, an ammeter, and the like. These sensors are provided for making to monitor the operation behavior of respective component parts of the mining machine, and as a result of the detection, warning is generated for ensuring to understand the operator in operation of the mining machine, if necessary. On the basis of the warning generation, the operator may be allowed to apply a proper measurement such as to reduce load of the corresponding component or instrument part.

Although the several kind of warning means may be adopted to the operator of the mining machine, a system may be adopted that, for example, one warning means is used such as buzzer or the like with respect to warning signal, and two or more warning levels are set in connection with warning indication on operation control as descried hereafter. Warning on the side of mining machine and warning indication on the side of the management center may have same characteristic, but warning manner for the management center may have different characteristic from the warning for the mining machine which has plural levels.

The detection data from respective sensors transmit to the management center after predetermined processing being performed. The operation process of the mining machine is controlled on the basis of the detection data. Operation management shows a chronological graph of the output signal of various sensors after signal processing. This is operating status detection data of instruments. Further, a warning indication data is created in addition to or in replace of the instrument operating status detection data. The warning indication data is to generate warning when the detection level of the sensor becomes over a predetermined standard level which is set as a baseline level with respect to sensor output, thus preparing chronologically aligned warning indication. The warning indication may be included plural levels such as "alert level" and "pandemic level".

It is supposed that some failure may be occurred in any instrument or component part at the time that higher level of warning indication or repeated warning indication was generated. However, there is possible situation to be caused by defect of the sensor, or to be brought about by operation manner of the operator, in addition to the actual defect of the instrument or component part. In other words, a proper judgment cannot be made for details of warning merely by the instrument operating status detection data or warning indication data, specifically as to either causing trouble in any component part or any sensor, or problem in operator's quality and ability. Further, in a case of trouble in a component part of instruments, it is unknown about whether or not to be performed maintenance, when to do so, which portion is required to make maintenance, and whether or not replacement of any component part is needed.

In consideration of foregoing matters, additional related information can be shown on the image display member in addition to the chronologically aligned warning indication. The additional related information is stored in the information storage member, specifically in data base, thereby the related information being read out from the information storage member and being indicated on the image display member together with the chronological warning indication.

Available image in relation with the related information to be displayed on the image display member is not limited to one kind information, but can be selected from several kinds of related information. For the sake of the selection, shift icon designation region can be formed on the image display member for switching to display one of plural number of the related information, thereby allowing to display necessary information by clicking one of icons shown in the shift icon generation region.

In this connection, maintenance information is one of the related information. In a case that maintenance history for one of instruments is shown on the image display member is displayed, a judgment can be done whether or not time has come for conducting maintenance, and whether incomplete matter, error or the like had happened at a last maintenance work, and if judged necessary to be conducted maintenance, a maintenance menu can be prepared. As a result, maintenance performance can be done in speedy and certain manner.

In a mining field, plural number of dump trucks are organized with one excavator. All of these dump trucks are performed same operation to travel substantially same driving root. Therefore, by comparing respective detection data concerning operation components in each dump truck, difference in operation level can be known between a sensor of a dump truck which is generated warning and those of other dump trucks, thereby the quality and ability of individual operator of the dump truck is revealed by the extent of difference in respective detection data. As a result, in a case where the apparent difference is resided in output data concerning operation components in skill of individual operator, but does not run into any trouble, maintenance work should not be carried out irrespective of warning indication, but other measurement should be taken to such situation. Comparing respective detection data concerning operation components to those of other dump trucks is also recognized in the difference of sensibility for respective sensor.

Effects of the Invention

Operation situation of a mining machine at working field is accurately recognized at a remote position of the mining machine, thus ensuring prompt troubleshooting.

EMBODIMENT OF THE INVENTION

Figure 1:
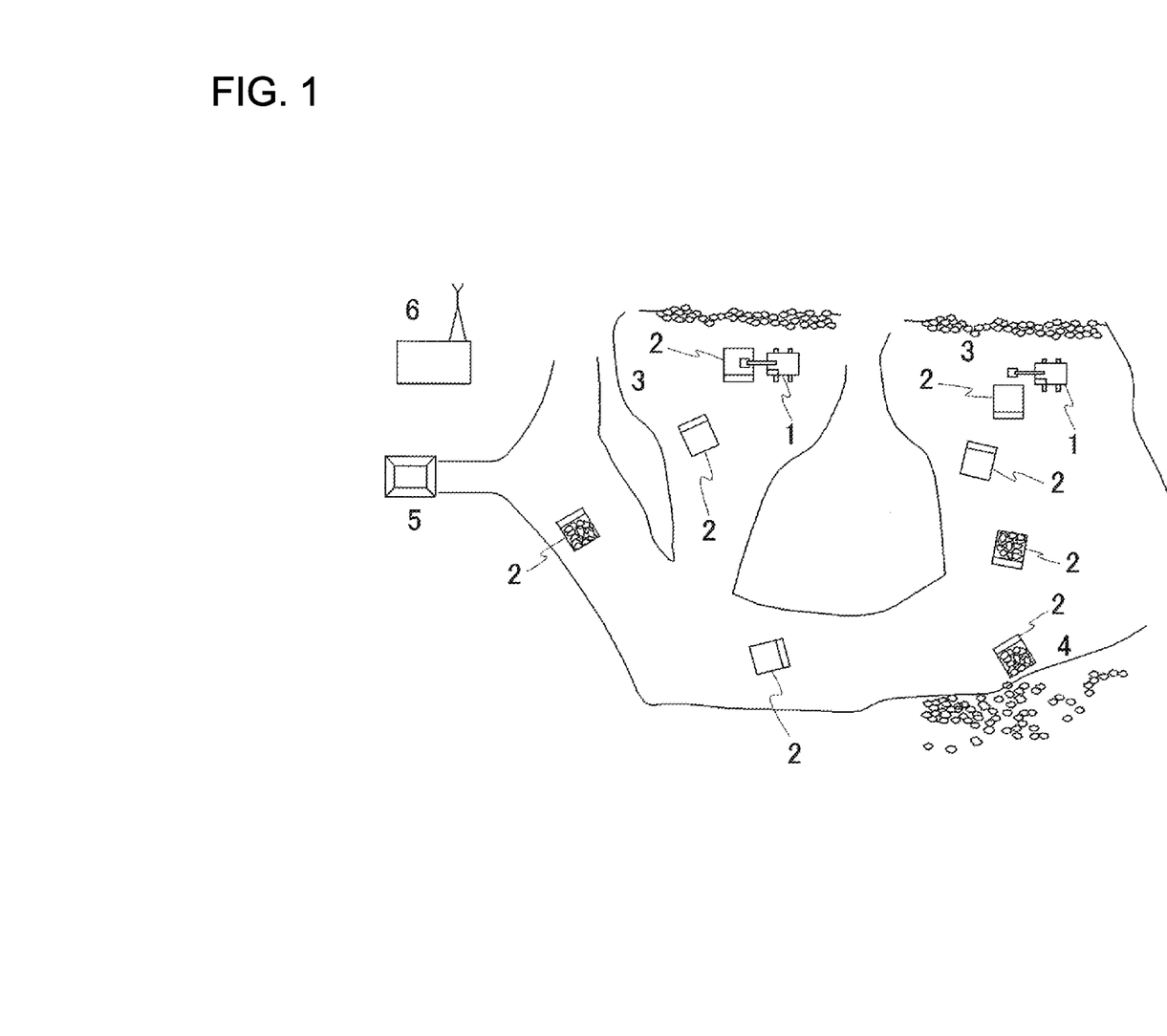
FIG. 1 is a schematic diagram to show mining works in mining field in one embodiment of operation by a mining machine.

Hereafter, embodiments of the present invention will be described with reference to the attached drawings. First of all, all over a mine site in which as self-propelling mining equipment a excavating machine 1 and dump truck 2 are operated is schematically shown in FIG. 1. In this figure, 3 denotes the mine site, 4 denotes a dumping site for dumping useless earth and sand, and 5 denotes a separating yard for extracting useful ore. In this figure, two vein of ore are existing in the field of mining, thus being operating in respective mining field an excavating machine 1 as hydraulic or electric shovel, and the dug ore being transferred out from the mine site 3 by means of a dump truck 1. Useless earth and sand is dumped to the dumping site 4 and useful ore is transferred to the separating yard 5 for extraction. Extraction is performed for separating the dug ore to useful ore and to useless ore, relevant equipment such as a crusher is installed in the separating yard 5.

Figure 2:
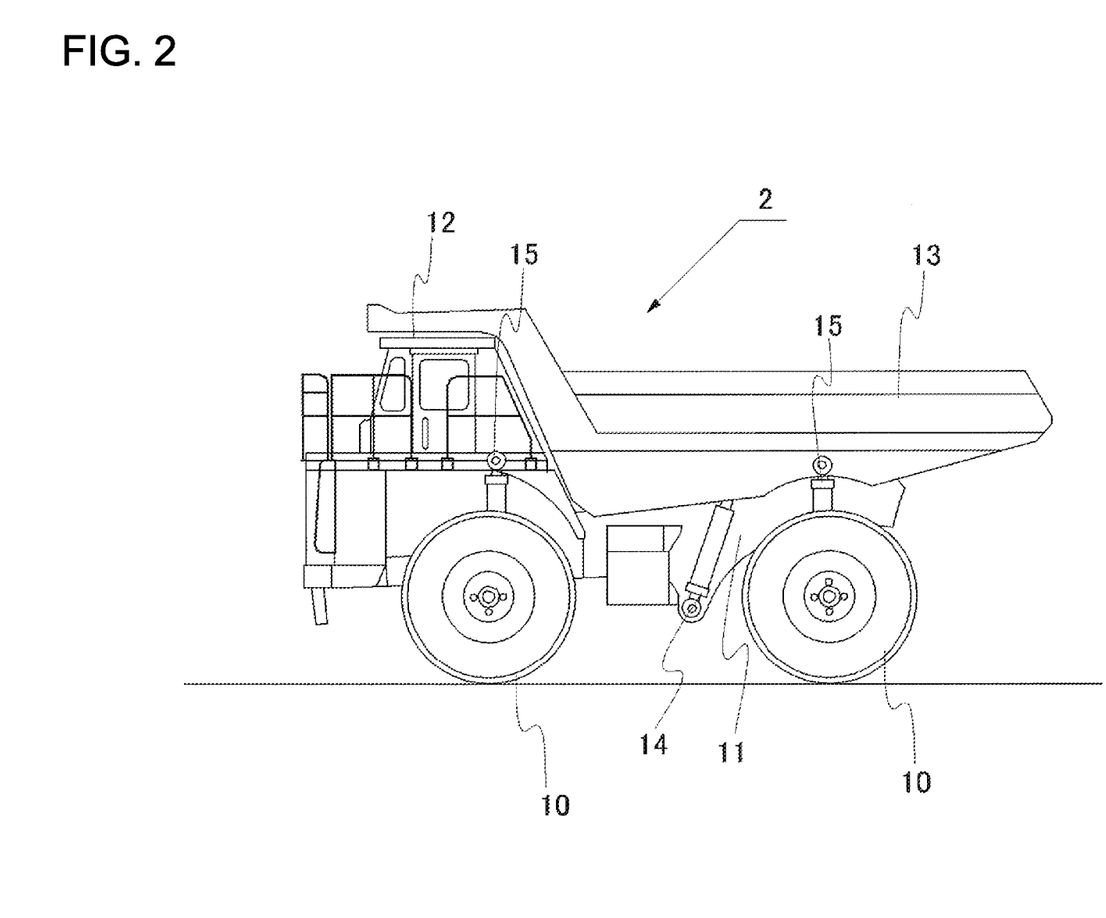
FIG. 2 shows a side elevation view of a dump truck as an example of the mining machine.

A working unit is constituted in one excavating machine 1 for plural number of dump trucks 2. In this figure, four dump trucks 1 are allocated per one excavating machine 1. The dump truck 2 has a construction as shown in FIG. 2. That is, a vehicle body frame 11 which is mounted wheels 10 is provided an operator's cab 12 and a vessel 13. The vessel 13 is loaded dug substance by the excavating machine 1 runs between the mine site 3 and the separating yard 5 or between the mine site 3 and the dumping site 4.

The dump truck 2 is positioned at the mine site 3 and is loading in the vessel dug substance by the excavating machine 1. The dump truck 2 thus loaded dug substance is transferred through a predetermined root to the separating yard 5 (to dumping site 4, in a case of useless dug substance), then the dug substance is dumped by tilting the vessel 13 toward rearward direction, or pursuing dumping action. After then, the vessel 13 is restored to horizontal state and the dump truck 2 travels to return the mine site 3. In the following explanation, operation management is referred to as adapted to a dump truck 2, the operation management apparatus can also be applied to other self-propelling mining equipment such as excavating machine or the like.

The above-mentioned dumping action is actuated by a dumping cylinder 14. Suspension cylinders 15 are extended to between the vehicle body frame 11 of the dump truck 2 and axles of traveling mechanism respectively at the fore and rear, right and left positions. These suspension cylinders 15 detect the load weight on the dump truck 2.

Figure 3:
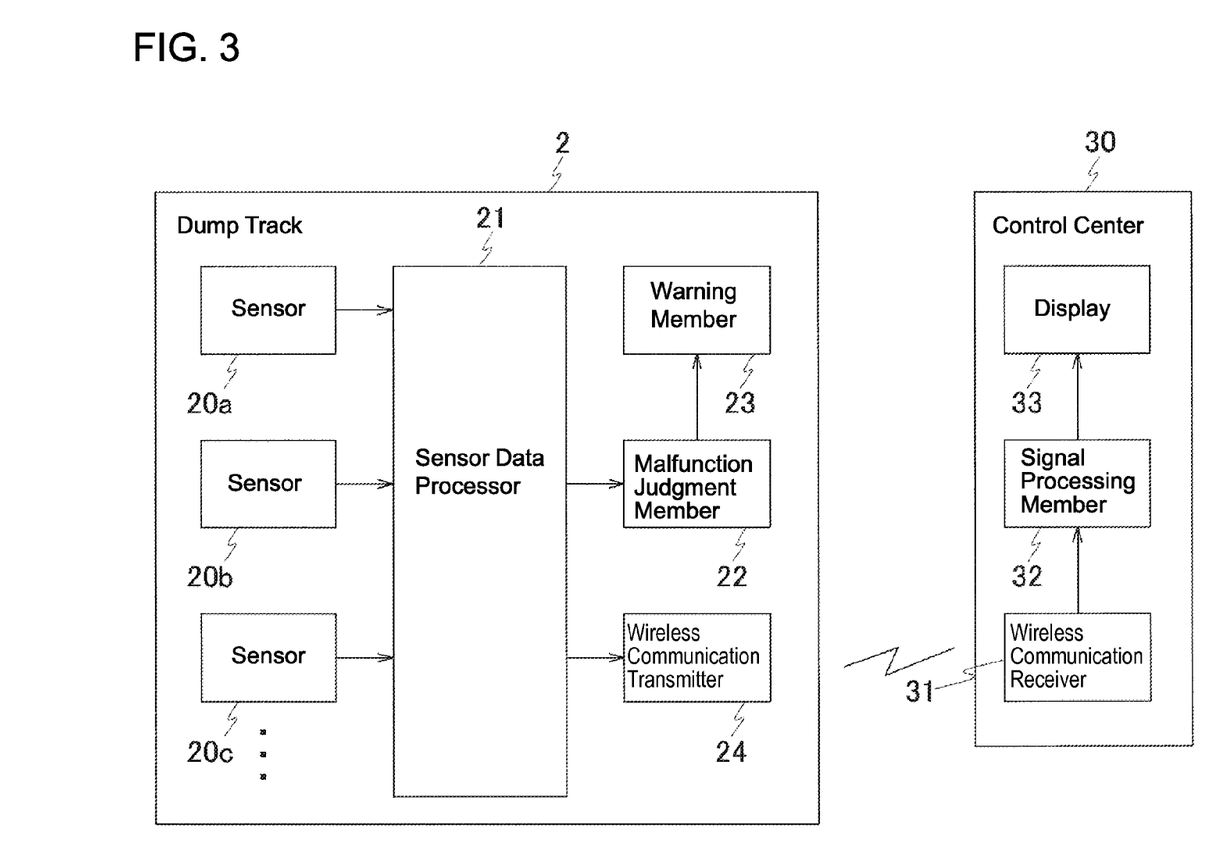
FIG. 3 is a block diagram of one example for operation management of the dump truck.

The dump truck 2 are mounted various sensors 20a, 20b, 20c, . . . (generically called as reference numeral 20) to detect whether or not respective component parts are operated properly, thereby being adapted to monitor the operation states of respective component parts. As shown in FIG. 3, the detection signal of the sensor 20 is transmitted to a sensor data processor 21 to process predetermined input signal. The sensor data processor 21 prepares detection data concerning the component parts which is displayed in a form of graph to chronological arrangement of the signal level from the sensor 20.

Figure 4:
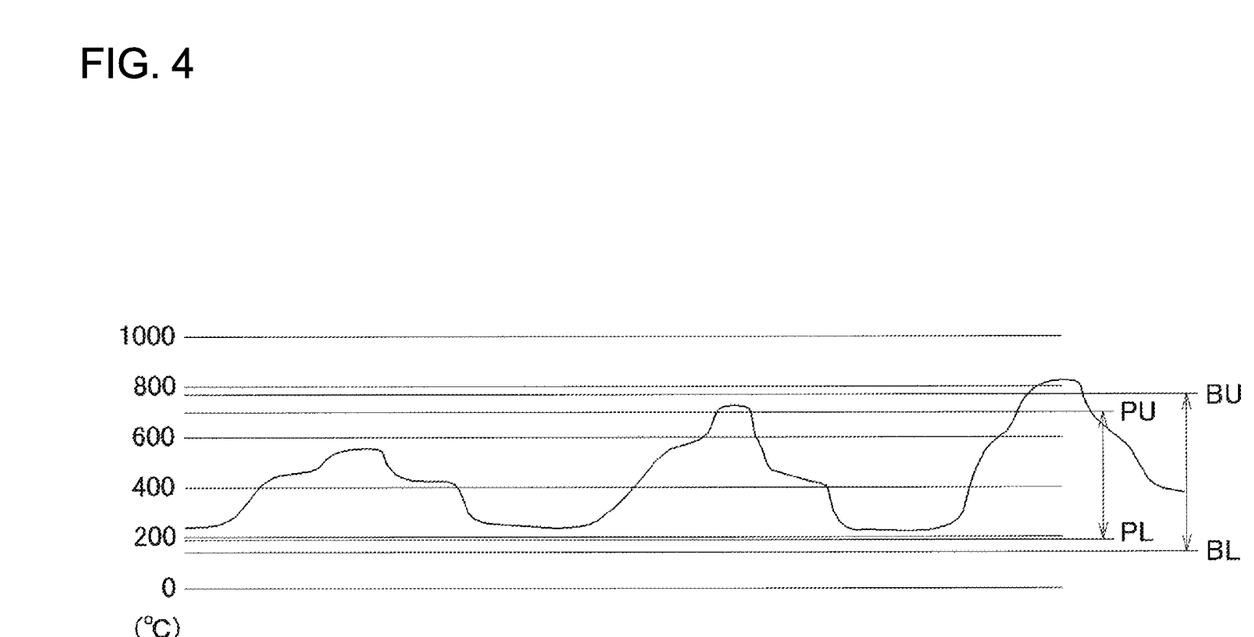
FIG. 4 is an explanatory drawing to show detection data change in exhaust gas temperature as one sensor of the dump truck.

Temporal transition in chronological with respect to exhaust gas temperature of engine is shown in FIG. 4, as an example of detection in the sensor 20. Exhaust gas temperature is an important administration item in relation to environmental pollution, protection of instruments, fuel consumption efficiency and the like, thus exhaust gas temperature should be restricted within a predetermined range. For this reason, proper temperature range PU-PL and limit temperature rang BU-BL are set in FIG. 4. The exhaust gas temperature is transitioned within the range of PU-PL, the dump truck 2 is traveled in a proper state. Even if over proper temperature PU or under proper temperature PL, there is no problem for traveling per se as far as within limit temperature rang BU-BL. However, higher than limit temperature BU or lower than limit temperature BL, there is possibility to occur damage or failure in engine or related instruments.

A malfunction judgment member 22 is connected to the sensor data processor 21, the malfunction judgment member 22 decides to whether or not warning is to be generated. In this connection, since proper temperature range PU-PL and limit temperature rang BU-BL are set, two stage warnings can be set corresponding to the two temperature ranges. In this connection, warning generated from a warning member 23 to the operator of the dump truck 2 is selected to the limit temperature range BU-BL, thus in a case where the malfunction judgment member 22 is detected that exhaust gas temperature is out of the limit temperature range BU-BL, a buzzer is sounded as an alarm. For the sake of warning, for example, it may be set that in a case out of proper temperature range PU-PL, a lamp is lighting as "alarm level", while in a case out of limit temperature range BU-BL, in order to definitely notify to the operator as "pandemic level", by the lamp and the buzzer are simultaneously functioned.

A management center 30 is established at a desired position in the mining field, the management center 30 making controls various works in the overall mining field. The dump truck 2 is provided a wireless communication member 24, thereby the wireless communication transmitter 24 facilitating to transmit the detection data about operation of the component parts to the management center 30 with wireless communication.

A wireless communication receiver 31 is mounted on the side of the management center 30 so that various data transmitted from the wireless communication transmitter 24 of dump truck 2 are received in the wireless communication receiver 31. Further, the wireless communication receiver 31 is connected to a signal processing member 32, thereby the signal processing member 32 being prepared necessary data to produce management image to be shown on a display 33. In this connection, the management image includes transition of operating state and warning indication.

Figure 5:
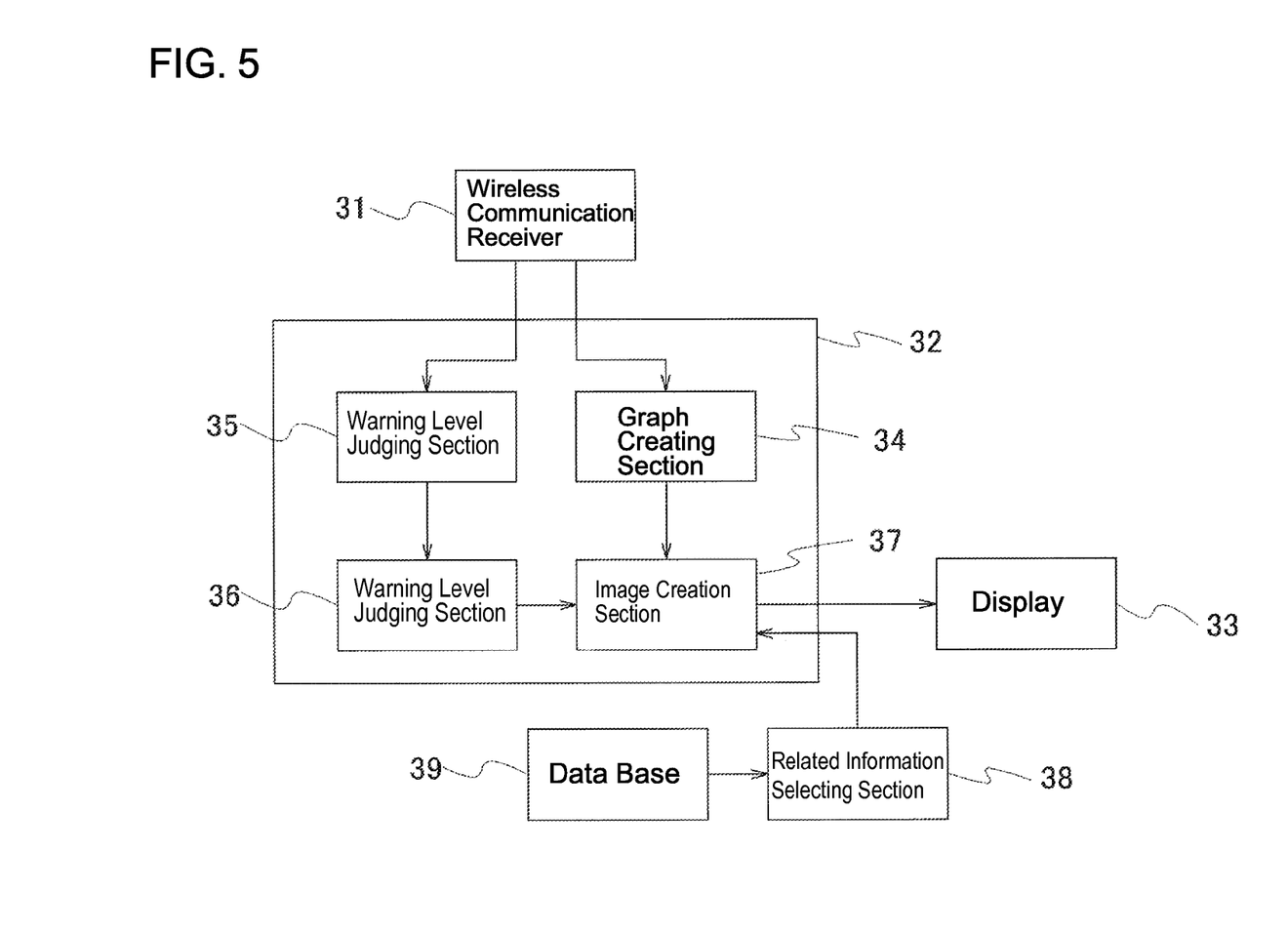
FIG. 5 is a block diagram of composition of signal processing apparatus installed in a management center provided in a mining field.

The construction of the signal processing member 32 to prepare the management image in FIG. 5. As shown in this figure, the wireless communication receiver 31 receives the instrument operating status detection data which is acquired by sensors 20 provided in various actuating instruments consisting of the dump truck 2. Here, for example, a sensor 20 is provided for detecting temperature of exhaust gas from an engine of the dump truck 2, thus explanation hereinafter is made in relation to control exhaust gas temperature of the engine on the basis of detection data of actuation state of instrument.

Figure 6:
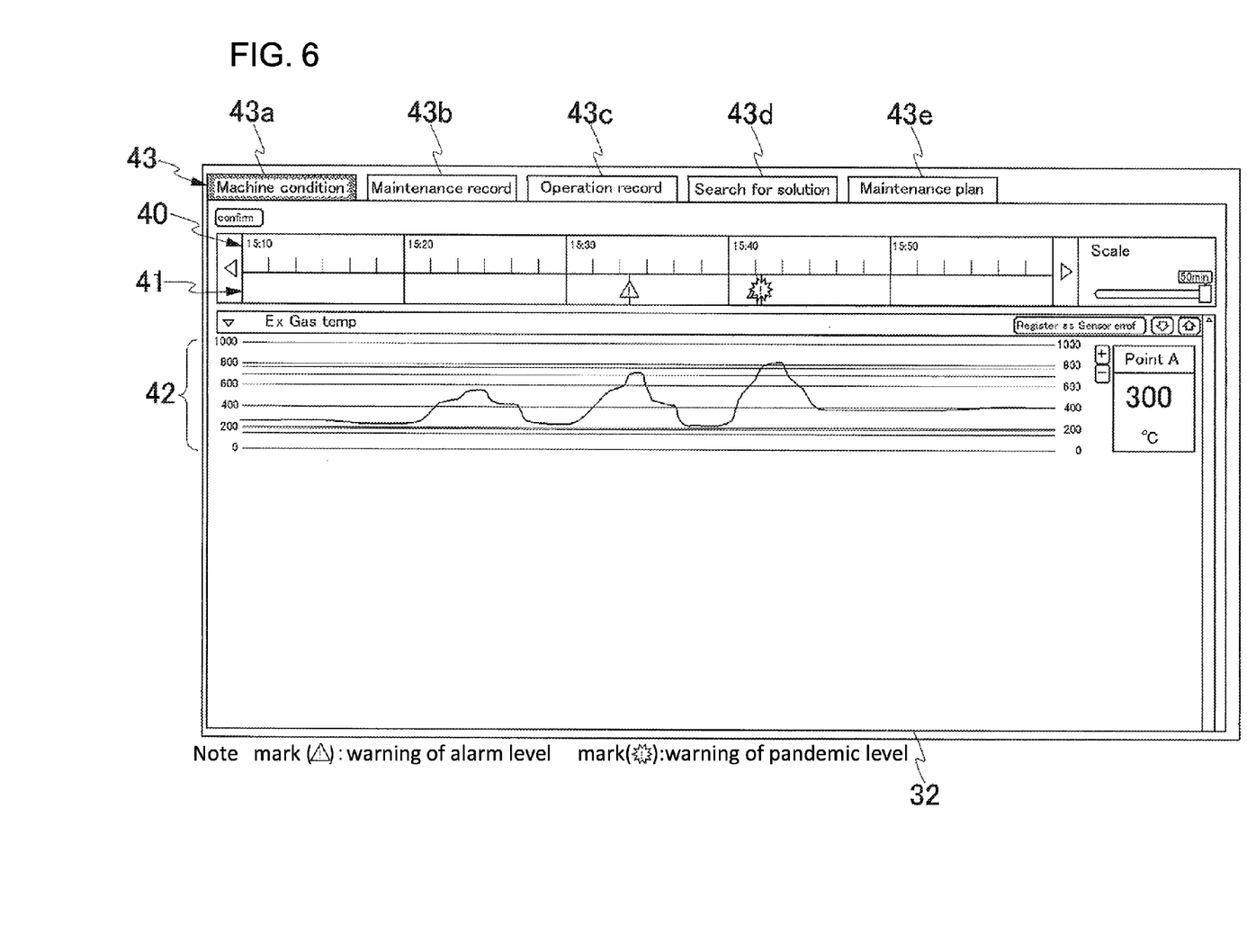
FIG. 6 is an explanatory drawing of a image display member to show an image of situation of operation works of the mining machine on a display.

The detection data of exhaust gas temperature of the engine is transmitted from the dump truck 2 together with other data, then these data are received by the wireless communication receiver 31 of the management center 30, thereby a graph creating section 34 prepares instrument operating status detection data in a form of graph which shows transition in chronological pattern of engine exhaust gas temperature provided in the dump truck 2. Data for plural stage warning indications, such as "alarm level" and "pandemic level", are created depending upon instrument operating status detection data. Therefore, the signal processing member 32 has a warning level judging section 36, the warning level judging section 36 detects and which level is detected. The management image shown on the display 33 consists of the instrument operating status detection data and warning generation data arranged in the form of chronological pattern. FIG. 6 shows an example of management image on the display 33. The management image shown in FIG. 6 contains a chronological graph of engine exhaust gas temperature of the dump truck 2.

Plural display areas are assigned on a screen of the display 33. The screen shown in FIG. 6 has a time axis indication region 40, a warning indication region 41 and an instrument operating status detection data 42. Further, a shifting icon indication region 43 is provided at the upper portion of the screen.

The instrument operating status detection data 42 is indicated the temporal transition in chronological of the engine exhaust gas temperature as shown in FIG. 4. The warning indication region 41 shows warning generation along the line with time axis. In the figure, warning mark with triangular shape represents generation of warning at alarm level which is outside of the proper temperature range PU-PL, while in a case where being generated warning at pandemic level outside of the limit temperature range BU-BL, the warning is represented in the form of gear shape, that is generating the warning of a level with which a danger will possibly be caused damage for the engine of other instruments. Thus, there are two level warnings, the generated warning level is determined by the warning level judgment section 36 in accordance with the signal from the wireless communication receiver 31. The operation status detection data of instruments prepared from the graph creation section 34 and warning indication data prepared from the warning level judgment section 36 are inputted to an image creation section 37, thereby being displayed administration data image consisting of transition of engine exhaust gas and warning indication on the display 33.

The administration data image shown in FIG. 6 is an instrument operation status detection data. Other image can be shown on the display 33 in place of the operation status detection data of instruments. The shift icon designated region 43 is provided for this purpose. Therefore, the screen of the display 33 is sifted to show a specified image by making selection of one of icons 43a to 43e in the shift icon designated region 43.

When the icon 43a is selected, the operation status detection data of instruments as shown in FIG. 6 is displayed. Thereby, engine exhaust temperature is shown on the display 33 and 2 kinds of the warning indications are indicated at the warning indication region 41 depending upon engine exhaust temperature.

Another display mode is adapted to be shown by the operation of the shift icon designated region 43. In this connection, the icon 43b is provided for selecting to show maintenance record indication screen, the maintenance record indication screen is as shown on FIG. 7 consists of date indication region 50, maintenance demand (recall) indication region 51 and maintenance performed indication region 52, further warning record indicating region 53. In addition, detailed list indicating region 54 is also presented on the display 33. The detail list indication region 54 contains list up the contents of item BU of maintenance demand indication, item TI of the performed maintenance, and item AL concerning warning to be started maintenance, respectively arranged in order of occurrence.

Figure 7:
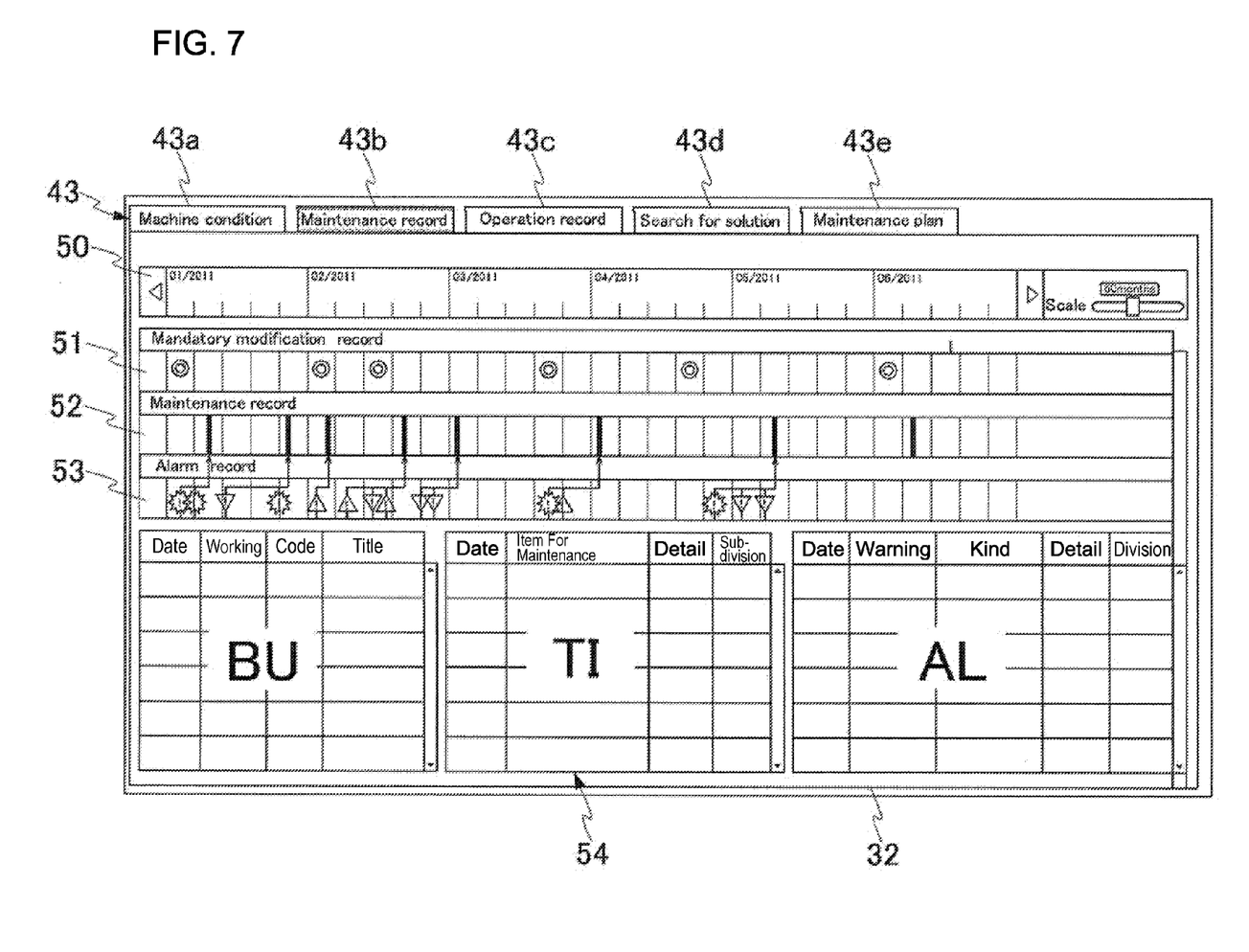
FIG. 7 is an explanatory drawing to show an image of maintenance history on the display.

At the time of performing maintenance, the icon 43b is selected to show maintenance record indication image on the screen, thereby history of performed maintenance being shown in the maintenance demand indication region 51, thus allowing to make reference of the judgment as to whether or not actually need the maintenance, and when and which kind of maintenance should be performed.

For the foregoing reason, a related information selecting section 38 is connected to the image creating section 37, and maintenance related information is in advance recorded in a data base 39 which is information recording member, thus being displayed in a detailed list indicating region 54 of data as shown in FIG. 7.

Further, when the shift icon designated region 43 is operated on the display concerned information, that is, in a case that the icon 43d is a selected, information as to resolving method can be acquired for dissolving the malfunction resulted to generated warning, while at the time of selected the icon 43e, information being available as to what work is necessary for the maintenance and lists of tool and accessary necessary for maintenance and inspection works. In addition, further information can be acquired as to whether or not maintenance is performed in proper timing, and whether or not the maintenance is properly performed.

Related information of the instrument operating status detection data 42 can be shown while keeping the indication of at least the warning indication region 41. In this connection, plural number of icons are provided for the shift icon designated region 43. In a case if the icon 43a is selected, the operation status of the dump truck 2 is indicated in the instrument operating status detection data 42.

Figure 8:
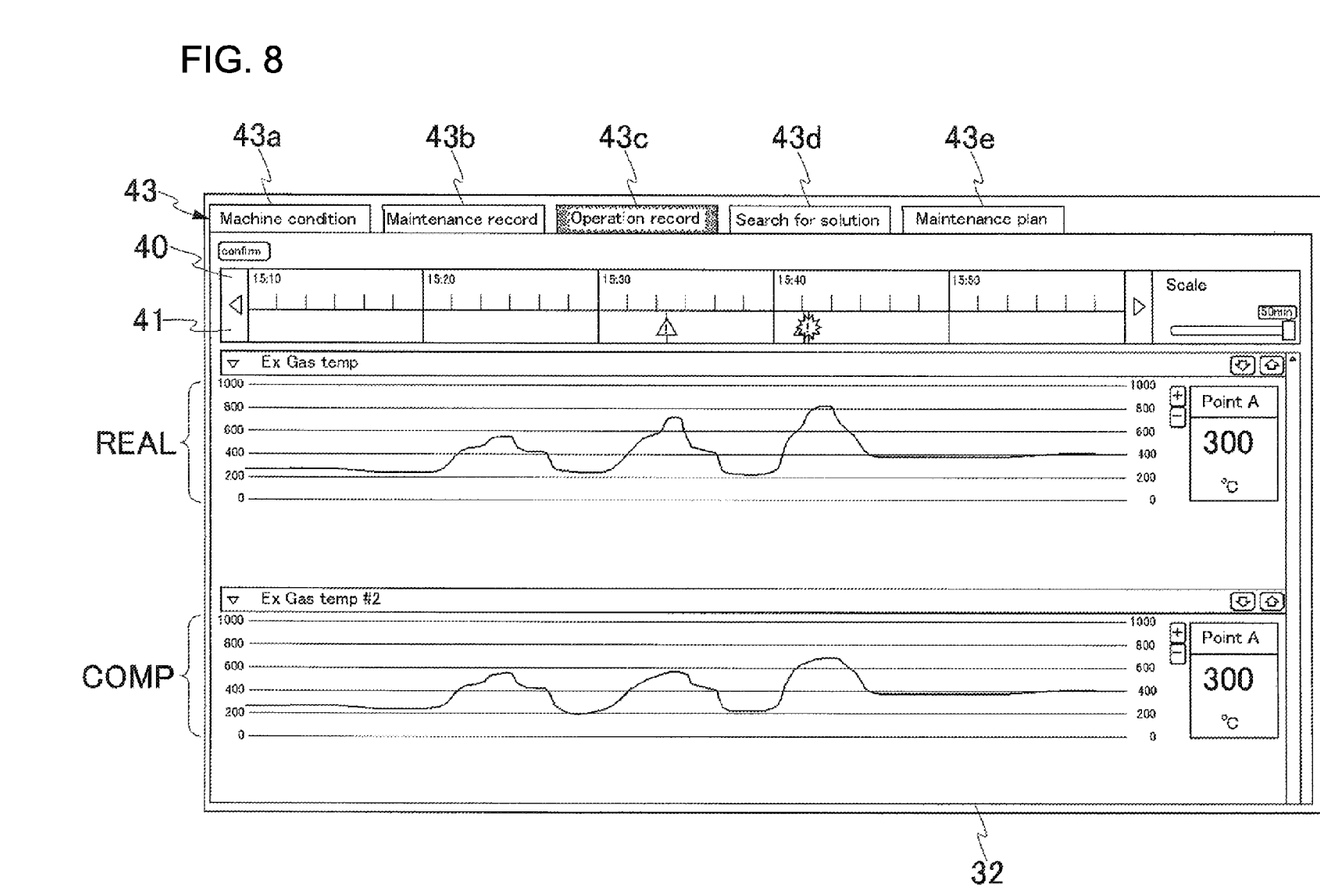
FIG. 8 is an explanatory drawing to show an image of comparative data on the display.

Further, at the time of selected the icon 43c, the screen is shifted to a comparative data as shown in FIG. 8. Plural number of dump truck 2 travel reciprocating between the mine site 3 and the separating yard 5, and respective dump truck 2 are traveling approximately predetermined route. Therefore, The chronological transition of exhaust gas temperature represented as the operation status data of instruments are to be indicated substantially similar trend. Therefore, in case of warning is generated, judgment can be made as to whether or not any malfunction is occurred, whether trouble is caused operation by the operator, or the like, by showing side by side on the display 33 the data REAL in one dump truck 2 and the data COMP of another dump truck.

In addition, plural number of sensors for exhaust temperature are arranged in the exhaust passage, thus accordingly allowing to show the display 33 a composite graph data indication CGD that graphs acquired from respective sensors are superposed form on the same time axis. Further, partially extracted indication LGD from the graph is shown on the same screen. By doing so, the difference of temperature in the exhaust passage of engine can be recognized, thereby being attained useful information for traveling management of the dump truck 2.

DESCRIPTION OF REFERENCE NUMERALS

1 excavating machine, 2 dump truck, 3 mine site, 4 dumping site, 5 ore dressing yard, 20 sensor, 21 sensor data processor, 22 malfunction judgment member, 23 warning member, 24 wireless communication transmitter, 30 management center, 31 wireless communication receiver, 32 signal processing member, 33 display, 34 graph creating section, 35 warning level detection section, 36 warning level judging section, 37 image creating section, 38 related information selecting section, 39 data base

The invention claimed is:

1. An operation management device for self-propelling mining equipment, the operation management device comprising:
  a wireless communication receiver configured to receive an output signal from a sensor for detecting an operation status of a component part of the self-propelling mining equipment;
  a signal processor connected to the wireless communication receiver, and which is programmed to produce a management image; and
  a display which is connected to the signal processor,
  wherein the signal processor is further programmed to execute:
  a graph creating section to create, as a graph indicating a temporal transition of the output signal, first instrument operating status detection data from the output signal,
  a warning level judging section to judge whether or not a value of the output signal is respectively out of one or more predetermined standard levels,
  a warning indication creating section to create one or more warning indications for the respective predetermined standard levels at one or more timings when the value of the output signal is judged to be out of the respective predetermined standard levels, and
  an image creating section to create the management image by using the first instrument operating status detection data, the warning indications, and second instrument operating status detection data that is instrument operating status detection data of other self-propelling mining equipment performing a same work as the self-propelling mining equipment in a mining field and is held in a database connected to the operation management device, and to output the management image on the display, and
  wherein the image creating section creates the management image to display the first instrument operating status detection data and the second instrument operating status detection data side by side on a same time axis in a predetermined region for displaying instrument operating status detection data and to display the one or more warning indications at positions on the same time axis, which correspond to the one or more timings when the value of the output signal is judged to be out of the respective predetermined standard levels, in a predetermined region for displaying warning indications.

2. The operation management device according to claim 1, wherein, upon receiving an instruction via a predetermined shifting icon indication region in the management image in a state where the management image is displayed, the image creating section creates, in the predetermined region for displaying instrument operating status detection data, a second management image in which related information related to the first instrument operating status detection data is displayed, and outputs the second management image on the display.

3. The operation management device according to claim 2, wherein the related information contains a maintenance history of the self-propelling mining equipment.

* * * * *